July 8, 1958  D. G. ANDERSON  2,842,331
PINCH-OFF VALVE
Filed Oct. 26, 1955

INVENTOR.
DONALD G. ANDERSON
BY
Joseph E. Ryan
ATTORNEY

United States Patent Office 2,842,331
Patented July 8, 1958

2,842,331

PINCH-OFF VALVE

Donald G. Anderson, Minneapolis, Minn., assignor to Minneapolis-Honeywell Regulator Company, Minneapolis, Minn., a corporation of Delaware Application October 26, 1955, Serial No. 542,852

5 Claims. (Cl. 251—6)

The novel device disclosed is a pinch-off tube type valve and more particularly it is a pinch-type valve in which the operator of the pinch-off mechanism is concentric with the tube.

The primary object of this novel device is to provide a valve with an unobstructed fluid flow passage having a concentric operating mechanism. This valve, when open, can be made to have a straight through fluid channel.

It is a further object of this device to provide a valve capable of slender construction, as opposed to the usual solenoid valve construction.

Still anothr object of this novel device is to provide a quiet operating unit, as the closing members and surfaces operate on a pliable tube.

These and other objects will become apparent from a consideration of the following specifications when considered with the attached drawings, wherein.

Figure 1:
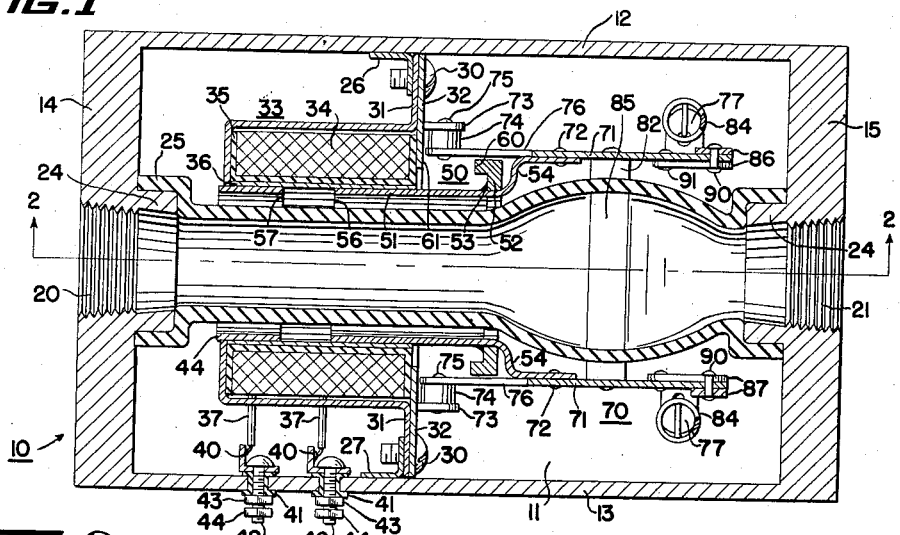
Figure 1 is a top view, in cross section, of the valve.

The valve housing is generally shown at 10 and is formed having a bottom 11, two sides 12 and 13, two ends 14 and 15, and a top or cover plate 16. The valve housing 10 can be formed from a single casting or fabricated from separately prepared parts in any desired manner. The valve housing 10 further has an inlet 20 and an outlet 21 having standard pipe threads of suitable size. It is understood that the inlet and outlet can be reversed if desired. The cover plate 16 is held in position on the valve housing 10 by four screws 22 and associated washers 23. It should be noted that the valve housing 10 has a rather long, rectangular appearance and in no way resembles a conventional solenoid controlled valve. It should be further pointed out that the valve housing disclosed in this specification has been considerably simplified for ease of showing, and that the actual valve design would be more closely contoured to the actual solenoid operator.

The end members 14 and 15 each have inwardly projecting hub members 24 which form a continuation of the inlet 20 and outlet 21. A pliable tube 25 joins the inlet 20 and the outlet 21 and it attached to the hubs 24 by use of a mastic or clamps (not shown). With this arrangement it is obvious that the inlet 20 and outlet 21 are connected by a straight through passage and that an unrestricted fluid flow is obtainable.

Attached to walls 12 and 13 of the valve housing 10 are two brackets 26 and 27. The brackets 26 and 27 can be attached by means of welds, or in the case of a cast housing 10, the brackets 26 and 27 may form an integral part of the housing walls 12 and 13. Supported from brackets 26 and 27 by screws 30 are the solenoid supports 31 and the linkage support 32. As shown in Figure 1, the solenoid supports 31 follow the outside contour of a solenoid operator shown generally at 33. The solenoid operator 33 consists of a plurality of members including a coid 34, wound on an insulating bobbin 35, which is supported by a non-magnetic solenoid tube 36. The solenoid coil 34 has two power leads 37 which are joined to two terminals 40. The terminals 40 are supported by insulating grommets 41 which pass through the side wall 13. The terminals 40 are held rigidly against grommets 41 by bolts 42 and lock nuts 43. Additional nuts 44 are placed on the bolts 42 to provide means of attaching the outside lead wires (not shown). It is understood that the terminals 40 could be mounted through any of the walls of the housing 10 that are convenient and it is pointed out that the location shown in Figure 1 was selected merely for illustrative purposes.

A magnetic ring 44 is placed in the inlet end of the solenoid operator 33 and is attached to the solenoid tube 36 and mounting brackets 31 by any convenient means such as soldering or brazing. Also within the solenoid tube 36 is placed a slidable armature which is generally shown at 50. The solenoid operator 50 consists of a tubular member 51 which is encircled by a circular magnetic washer 52 which is joined thereto at 53 by a weld or similar process. Also attached to armature 50 are two projections 54, which extend towards the outlet side of the valve housing 10 and which are parallel with the pliable tube 25. The solenoid operator can be made up of a stamped part consisting of a tubular member 51 and the linkage operators 54, and can be easily accomplished by stamping this unit from a flat sheet of magnetic material and then rolling the stamped part into the proper circular form around a mandrel-like die. After the forming of the circular sections the magnetic washer 52 can be slid into place and then welded at 53. As previously pointed out the armature 50 is allowed to slide in the solenoid tube 36 and it will be noted that the edge 56 of the armature 50 will meet the edge 57 of the magnetic ring 44 at the same time the face 60 of the magnetic washer 52 meets the face 61 of the linkage support 32. A complete magnetic circuit can be traced for this solenoid through the solenoid support member 31, the magnetic ring 44, the armature 50 and the linkage support 32.

A pinch-off valve operator is generally shown at 70 and is operated by linkage operators 71. The linkage operators 71 are attached by rivets 72 to the solenoid operator arms 54. It is obvious that with this arrangement as the solenoid operator 50 is moved into the solenoid tube 36 the solenoid arms 54 and linkage operators 71 are also moved, and this movement is parallel with the pliable tube 25.

Supported on linkage operator support 32 are four brackets 73 which in turn support bearings 74 and assembly rivets 75. Rotatably mounted on the bracket 73 by means of the bearing 74 and rivet 75 are four clamp arms 76. These arms 76 are L-shaped and have spring mounting ears 77 integrally attached thereto at their end remote from the end which is supported by bracket 73. A pressure bar 80 is supported between two upper clamp arms 76 and is in the form of a roller. The pressure bar 80 is supported on a circular pin 81 and is free to rotate about the pin 81. A second pressure bar 82 joins the lower clamp arms 76 and is attached thereto by rivets 83. It is noted that in the particular embodiment shown the pressure bars 80 and 82 are of different shapes. This particular arrangement is illustrative only of two of the different types of pressure bars useable and it is pointed out that both of the pressure bars could be circular in design, both flat in design, or of any desirable cross section which would provide suitable pressure on the pliable tube 25.

Two coil springs 84 join pairs of spring mounting ears 77 such that the clamp arms 76 are pulled together and the pressure bars 80 and 82 exert a pressure on opposite sides of the pliable tube 25. With this arrangement it is possible to clamp the tube closed as at 85. Pairs of cross links 86 and 87 join the ends of the linkage operators 71 to the spring mounting ends of clamp arms 76. These connections are performed by the use of rivets 90 and 91 in such a manner that the cross links are free to rotate relative to the adjoining members and about the rivets 90 and 91.

*Operation*

Figure 2:
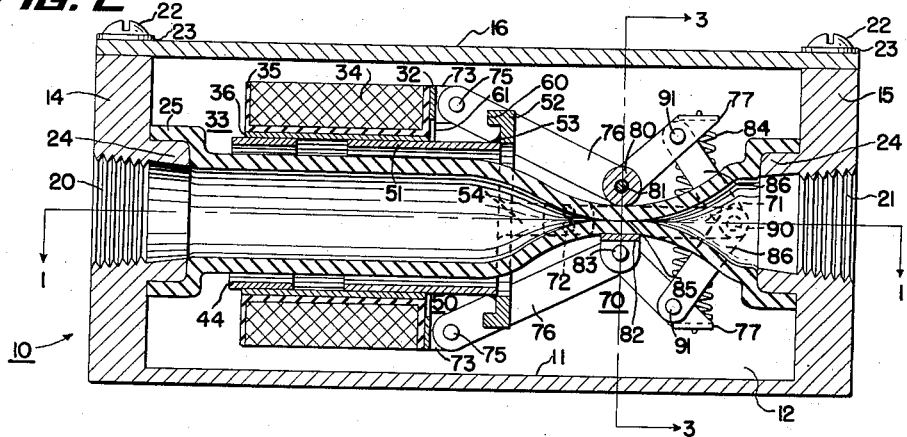
Figure 2 is a side view of the valve of Figure 1, in cross section.
Figure 3:
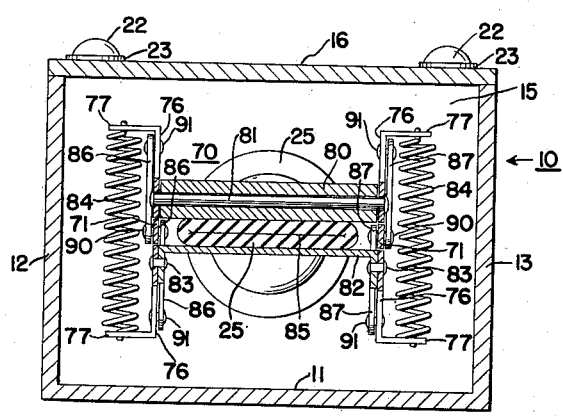
Figure 3 is a cross sectional view taken through the pressure bars of the device disclosed in Figure 1.

The operation of this novel solenoid pinch-off type valve can best be understood by considering the unit when it is initially de-energized. When the unit has no power supplied to it the solenoid operator 50 is in its most extended position. This is the position shown in Figures 1 through 3. Under these conditions the coil springs 84 apply an attractive force upon the opposite spring mounting ears 77 which cause the clamp arms 76 to be brought together. When the clamp arms 76 are brought to this position the pressure bars 80 and 82 are applied directly to opposite sides of the pliable tube 25. The springs 84 are made strong enough so that the force supplied therethrough is adequate to pinch the pliable tube 25 completely closed. This can be seen best in Figure 3, as noted at 85.

Upon energization of the solenoid 34 by applying power to the terminal bolts 42, the armature operator 50 is moved to the left. This movement brings the surfaces 56 and 57 closely adjacent to one another and also allows the magnetic washer 52 to move until its surface 60 is adjacent the surface 61 of the operator mounting bracket 32. This movement pulls the linkage operator 71 to the left thereby causing the cross links 86 and 87 to exert a force on the clamp arms 76 in such a manner as to separate the pressure bars 80 and 82. When the pressure bars 80 and 82 have been removed from the pliable tube 25 its natural resilience opens the tube 25 for a straight through fluid flow.

The details disclosed in this specification have been of the preferred embodiment of the novel pinch-off type valve and are representative only. It is noted that the applicant wishes to be restricted only by the scope of the appended claims, as numerous other embodiments of this novel device would become immediately obvious to those skilled in the art.

I claim as my invention:

1. In a valve of the class described, a valve housing having an inlet and outlet joined by a pliable tube, a solenoid including a solenoid plunger slidably mounted within said solenoid and both supported concentrically with said tube, two linkage operators joined to said plunger at diametrically opposite points and extending parallel with said tube, two pair of clamp arms pivotally mounted at one of their extremities and having spring mounting ears at their other extremities, pressure bars joining each said pair of clamp arms and bearing on opposite sides of said tube, pairs of cross links pivotally joining the clamp arms and said linkage operators at their free extremities, and spring means connecting opposite pairs of the spring mounting ears to bias said pressure bars to pinch the tube closed when said solenoid is de-energized.

2. In a valve of the class described, a valve housing having an inlet and outlet joined by a pliable tube, a solenoid including a solenoid plunger slidably mounted within said solenoid tube and both supported concentrically with said tube, linkage operators joined to said plunger and extending parallel with said tube, pairs of clamp arms pivotally mounted at one of their extremities and having spring mounting ears at their other extremities, pressure bars joining each said pairs of clamp arms and bearing on the sides of said tube, cross links pivotally joining the clamp arms and said linkage operators, and spring means connecting opposite pairs of the spring mounting ears to bias said pressure bars to pinch the tube closed when said solenoid is de-energized.

3. In a device of the class described, a valve housing having an inlet and outlet joined by a pliable tube, a solenoid including a solenoid plunger slidably mounted within said solenoid and concentric with said tube, linkage operators joined to said plunger and extending parallel with said tube, clamp arms pivotally mounted at one of their extremities and having spring mounting ears at their other extremities, pressure bars joining pairs of the clamp arms and bearing on the sides of said tube, cross links pivotally joining the clamp arms and said linkage operator, and spring means connecting opposite pairs of the spring mounting ears to bias said pressure bars to pinch the valve closed.

4. In a device of the class described, a valve having an inlet and outlet joined by a pliable tube, a solenoid including a plunger slidably mounted concentric with a section of said tube, linkage operator means joined to said plunger and extending adjacent said tube, clamp arm means mounted for movement to pinch said tube, said clamp arm means having mounting means, pressure bars joining the clamp arm means and bearing on the tube, cross link means joining the clamp arm means and said linkage operator means, and resilient means connecting said mounting means to pinch the valve closed.

5. In a device of the class described, a valve having an inlet and outlet joined by a pliable tube, a solenoid including a plunger slidably mounted concentric with a section of said tube, operator means mounted for movement to pinch said tube joined to said plunger and extending adjacent with said tube section, and said operator means comprising pressure bars bearing on the sides of said tube and moved to pinch-off said tube by operation of said plunger.

References Cited in the file of this patent

UNITED STATES PATENTS

| 2,665,646 | Garrett | Jan. 12, 1954 |

FOREIGN PATENTS

| 301,087 | Italy | of 1932 |
| 1,017,647 | France | of 1952 |